United States Patent
Kim et al.

(10) Patent No.: US 9,215,737 B2
(45) Date of Patent: Dec. 15, 2015

(54) METHOD AND APPARATUS FOR MANAGING CONNECTION IDENTIFICATION IN PAIRING

(71) Applicant: Samsung Electronics Co. Ltd., Suwon-si, Gyeonggi-do (KR)

(72) Inventors: Kyungkyu Kim, Suwon-si (KR); Daegyun Kim, Seongnam-si (KR); Seunghoon Park, Seoul (KR); Chiwoo Lim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 63 days.

(21) Appl. No.: 13/950,945

(22) Filed: Jul. 25, 2013

(65) Prior Publication Data

US 2014/0030978 A1    Jan. 30, 2014

(30) Foreign Application Priority Data

Jul. 26, 2012  (KR) .......................... 10-2012-0081846

(51) Int. Cl.
*H04B 7/24* (2006.01)
*H04W 76/02* (2009.01)
*H04B 7/00* (2006.01)

(52) U.S. Cl.
CPC .................................. *H04W 76/021* (2013.01)

(58) Field of Classification Search
CPC ...... H04W 76/02; H04W 76/021; H04W 8/26
USPC ........................................ 455/39, 445, 41.2
See application file for complete search history.

(56) References Cited

U.S. PATENT DOCUMENTS

| | | | |
|---|---|---|---|
| 7,783,777 B1 * | 8/2010 | Pabla et al. | 709/238 |
| 8,005,091 B2 | 8/2011 | Wu et al. | |
| 2004/0252643 A1 | 12/2004 | Joshi | |
| 2008/0240146 A1 | 10/2008 | Singh et al. | |
| 2009/0019168 A1 * | 1/2009 | Wu et al. | 709/228 |
| 2010/0232292 A1 | 9/2010 | Joung et al. | |
| 2011/0047384 A1 * | 2/2011 | Jacobs et al. | 713/176 |
| 2012/0188981 A1 | 7/2012 | Chang et al. | |
| 2013/0102314 A1 | 4/2013 | Koskela et al. | |
| 2013/0217333 A1 * | 8/2013 | Sprigg et al. | 455/41.2 |

FOREIGN PATENT DOCUMENTS

| | | |
|---|---|---|
| KR | 2012/0073146 A | 7/2012 |
| WO | 2004/114690 A1 | 12/2004 |
| WO | 2011/109027 A1 | 9/2011 |

* cited by examiner

*Primary Examiner* — Ayodeji Ayotunde
(74) *Attorney, Agent, or Firm* — Jefferson IP Law, LLP (57) ABSTRACT

A method of performing pairing by a transmission terminal in device to device communication is provided. The method includes classifying a plurality of link identifications for identifying a data transmission and reception channel a seed of at least one link identification; selecting an available candidate link identification seed among the seed of the at least one link identification, transmitting a pairing request message including seed information associated with the selected available candidate link identification seed, and receiving a pairing response message corresponding to the pairing request message. When allocating a connection ID in a device to device communication environment, even if a small number of devices exist, an overhead for searching for the connection ID is not great. Further, when many devices exist within a specific range, a probability of devices having the same connection ID is reduced. Accordingly, the device to device communication can be easily performed.

20 Claims, 8 Drawing Sheets

METHOD AND APPARATUS FOR MANAGING CONNECTION IDENTIFICATION IN PAIRING

CROSS-REFERENCE TO RELATED APPLICATION(S)

This application claims the benefit under 35 U.S.C. §119(a) of a Korean patent application filed on Jul. 26, 2012 in the Korean Intellectual Property Office and assigned Serial No. 10-2012-0081846, the entire disclosure of which is hereby incorporated by reference.

TECHNICAL FIELD

The present disclosure relates to a method and apparatus for paring a transmission terminal in a device to device communication. More particularly, the present disclosure relates to a method and an apparatus for managing a connection IDentification (ID) in pairing which determines a channel exchanging information in device to device communication.

BACKGROUND

In general, there is a bandwidth allocated in device to device communication for the device to device communication. In order to exchange information between devices, there is a need for an operation of determining a channel exchanging information in the allocated bandwidth.

To this end, connection IDs corresponding to a channel exchanging information within the allocated bandwidth are determined, a connection ID differing from a connection ID to be used for a neighboring terminal is selected from the connection IDs, and the device to device communication is performed through a bandwidth of a channel corresponding to the selected connection ID.

However, in a pairing operation of allocating the connection ID, there is an overhead associated with searching for all connection IDs to be used by a peripheral terminal and with determining a connection ID which is not used.

Further, there is a method of selecting a corresponding connection ID by selecting a random number. However, in this case, when the number of peripheral terminals attempting communication is increased, a connection ID of another undesirable device repeats so that data cannot be transmitted and received to and from a described device.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and an apparatus for efficiently determining connection ID for communication in pairing in device to device communication.

In accordance with an aspect of the present disclosure, a method of performing pairing by a transmission terminal in device to device communication is provided. The method includes classifying a plurality of link identifications for identifying a data transmission and reception channel a seed of at least one link identification, selecting an available candidate link identification seed among the seed of the at least one link identification, transmitting a pairing request message including seed information associated with the selected available candidate link identification seed, and receiving a pairing response message corresponding to the pairing request message.

In accordance with another aspect of the present disclosure, a method of performing pairing by a reception terminal in device to device communication is provided. The method includes classifying a plurality of link identifications for identifying a data transmission and reception channel a seed of at least one link identification, searching for an available candidate link identification seed among the seed of the link identification, receiving a pairing request message including seed information associated with a candidate link identification seed selected by a transmission terminal side, determining a seed of a link identification to be used for communication based on the received candidate link identification seed information and the searched candidate link identification set, and transmitting a pairing response message including the determined seed information of the link identification to be used for the communication.

In accordance with another aspect of the present disclosure, a transmission terminal for performing device to device communication is provided. The transmission terminal includes a controller configured to classify a plurality of link identifications for identifying a data transmission and reception channel a seed of at least one link identification, and to select an available candidate link identification seed among the seed of the link identification, a transmitter configured to transmit a pairing request message including seed information associated with the selected available candidate link identification seed information, and a receiver configured to receive a pairing response message corresponding to the pairing request message.

In accordance with another aspect of the present disclosure, a reception terminal for performing device to device communication is provided. The reception terminal includes a receiver configured to receive a pairing request message including seed information associated with a candidate link identification seed selected by a transmission terminal side, a controller configured to classify a plurality of link identifications for identifying a data transmission and reception channel a seed of at least one link identification, to search for an available candidate link identification seed among the seed of the link identification, and to determine a seed of a link identification to be used for communication based on the received seed information associated with candidate link identification seed and the searched candidate link identification set, and a transmitter configured to transmit a pairing response message including the determined seed information of the link identification to be used for the communication.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIGS. 6A, 6B, 6C, and 6D are diagrams illustrating a method of dividing tiers of a link IDentification (ID) and seeds of the link ID according to an embodiment of the present disclosure.

Throughout the drawings, like reference numerals will be understood to refer to like parts, components, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Hereinafter, a method of acquiring a link Identification (ID) for device to device communication in a system which supports a direction communication service between devices. The link ID may be expressed as link ID or connection ID in some cases.

As one example, a SEED is configured as a seed of a usable link ID in order to acquire a link ID for direction communication between devices. An operation of broadcasting an available SEED, a procedure of finding the available SEED, and a procedure of generating a link ID may be sequentially performed.

The method of configuring the SEED will be described later.

Figure 1:
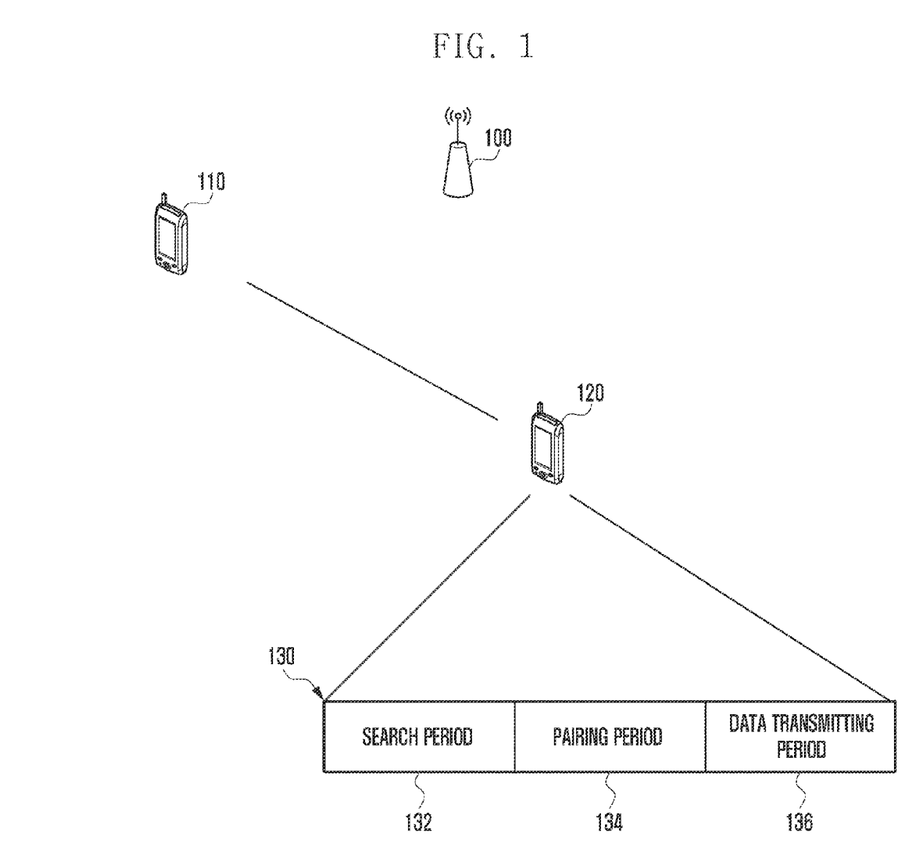
FIG. 1 is a diagram illustrating a communication relationship and a communication frame structure of a device to device according to an embodiment of the present disclosure.

FIG. 1 is a diagram illustrating a communication relationship and a communication frame structure of a device to device communication according to an embodiment of the present disclosure.

Referring to FIG. 1, device to device communication may be performed among a first device 110, a second device 120, and a base station 100. However, the base station may be a constituent element in the device to device communication.

The first device 110 and the second device 120 attempts communication without help of the base station 100. In this case, a frequency used for mutual communication by the first device 110 and the second device 120 may be a frequency of the base station 100 or a frequency other than a band used by the base station 100.

The first device 110 and the second device 120 may perform communication in a preset communication frame 130. The communication frame 130 may include a search period 132, a pairing period 134, and a data transmitting period 136. According to various embodiments of the present disclosure, a size of a section displayed on a drawing may not be proportional to a communication time, but may be a time interval which flexibly varies according to setting.

The first device 110 and the second device 120 perform a search procedure in the search period 132 to find another device. Hereinafter, devices of a system supporting a Device to Device (D2D) service may transmit device information within a time set as the search period 132 to another device based on a tone or a sequence to search a device.

The device information may include ID information of a device, interest, and application program information.

Further, when data to be transmitted to other searched devices exists, the devices in the system may transmit a Pairing Request Message to a corresponding device to which a transmission data will be transmitted through a pairing procedure during a pairing period 134.

The device transmitting and receiving data in the pairing procedure selects link ID capable of identifying a channel for transmitting data. A device receiving at least one pairing request message expresses pairing intention as a pairing response message to determine communication intention with another device pairing the device. The device determining a link ID transmitting and receiving data through the pairing response message, and transmitting and receiving data may transmit and receive data through a bandwidth allocated to the selected link ID. The pairing scheme will be described in detail through an embodiment of the present disclosure to be described later.

A device pair paired through a data transmitting procedure in a data transmitting period 136 after the link ID is selected in the pairing period 134 performs a distributed scheduling procedure in order to acquire a resource transmitting data based on the selected link ID. The device pair measures presence of interference with another device pair through pilot information based on a priority of the link ID to determine a presence of simultaneous transmission. The device pair completing the scheduling may transmit data from a resource mapped to the device pair link ID.

In this manner, the communication procedure described with reference to FIG. 1 may be performed in a synchronization state by preset timing by all devices in a network, and timing according to each procedure may be variably set according to the various embodiments of the present disclosure.

Figure 2:
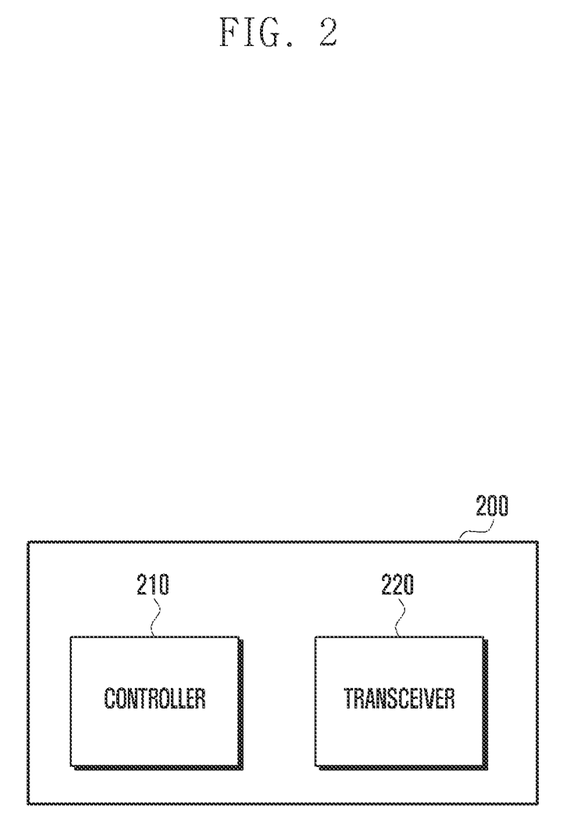
FIG. 2 is a block diagram illustrating constituent elements of a device according to an embodiment of the present disclosure.

FIG. 2 is a block diagram illustrating constituent elements of a device according to an embodiment of the present disclosure.

Referring to FIG. 2, the device 200 may include a controller 210 capable of controlling an overall operation of constituent elements, and a transceiver 220 capable of transmitting/receiving information under control of the controller 210.

The controller 210 may perform an operation based on information received by the transceiver 220, and may retransmit a result of the operation through the transceiver 220.

The transceiver 220 may transmit and receive information to and from another device or a base station under control of the controller 210.

According to various embodiments of the present disclosure, the controller 210 and the transceiver 220 may be constituent elements of a mobile communication terminal.

Further, according to various embodiments of the present disclosure, the transceiver 220 may include a transmitter for transmitting information and a receiver for receiving the information.

Figure 3:
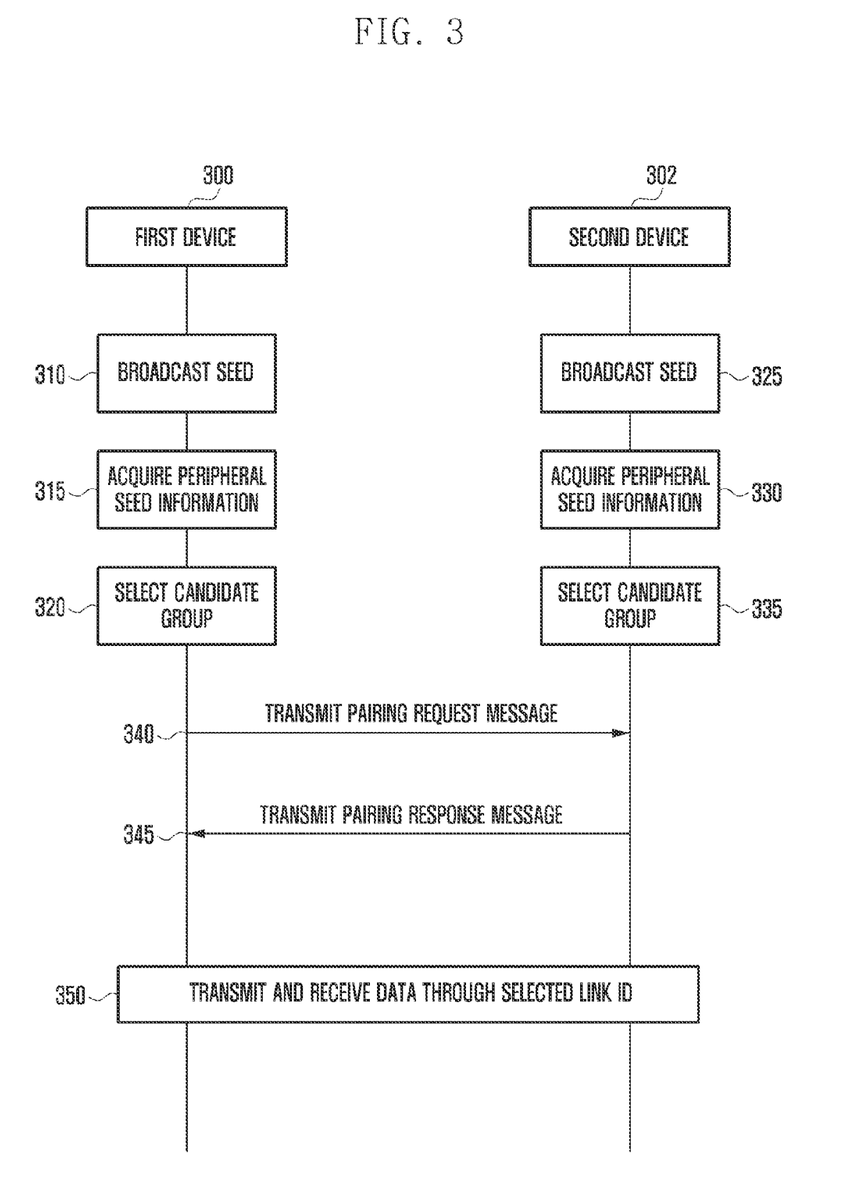
FIG. 3 is a flowchart illustrating signal flow in a device to device communication according to an embodiment of the present disclosure.

FIG. 3 is a flowchart illustrating signal flow in a device to device communication according to an embodiment of the present disclosure.

Referring to FIGS. 1 and 3, data is transmitted and received between a first device 300 and a second device 302.

According to various embodiments of the present disclosure, the first device 300 operates as a transmission side terminal and the second device 302 operates as a reception side device.

According to various embodiments of the present disclosure, the first device 300 and the second device 302 are in a state of acquiring information of other terminals, interest, and application program information. As an example, the information of other terminals may include the ID information of a device (e.g., of the other respective terminals).

The first device 300 and the second device 302 enter the pairing period 134 and operate.

At operations 310 and 325, the device 300 and the second device 302 may broadcast information of a currently used seed. In this manner, the currently used seed is broadcasted to continuously use the seed used in a previous communication frame 130. In this manner, the repeated use of a seed used for another peripheral device may be prevented by broadcasting the currently used seed. According to various embodiments of the present disclosure, when no seed is used in a previous communication frame 130 by the first device 300 and the second device 302, operations 310 and 325 may be respectively omitted.

At operations 315 and 330, the first device 300 and the second device 302 may receive the broadcasted seed information from peripheral other device pair in a seed broadcasting period. The total number of seeds may be a preset value according to the link ID. In addition, the seed is a set of a link ID for communication between devices and has a tier structure.

At operation 320 and 335, the device 300 and the second device 302 determine a selectable candidate seed group based on the seed information respectively acquired at operations 315 and 335.

The first device 300 and the second device 302 primarily selects the candidate seed group as the number of a seed not provided from a peripheral device in the operation 310 and 325 at which the seed is broadcasted. Seeds belonging to the highest tier among the selected seeds may be finally allocated as a candidate group. In other various embodiments of the present disclosure, the whole information of the selected candidate group may be stored. The number of seeds allocated as a plurality of candidate groups belonging to the same tier may be changed according to requirements of a system. A method of selecting the seed will be described later.

At operation 340, the first device 300 may transmit a pairing request message including selected seed candidate group information to the second device 302. The selected seed candidate group transmitted at operation 340 may include remaining seeds except for the seed used by a peripheral device acquired at operation 315. Accordingly, when the first device communicates with the second device by selecting the seed candidate group, a probability of repetition of a link ID with a peripheral device is reduced.

The second device may acquire information of a seed candidate group transmitted from the first device based on the received pairing request message. The acquired seed candidate group transmitted from the first device may be compared with a seed candidate group selected at operation 335. The acquired seed candidate group transmitted from the first device includes a seed group which another device neighboring the first device 300 does not use. The seed candidate group selected at operation 335 includes a seed group which another device neighboring the second device 302 does not use.

At operation 335, the second device 302 may select a common seed candidate group from the acquired seed candidate group transmitted from the first device and the seed candidate group selected. The common seed candidate group is a seed which a device around the first device 300 and a device around the second device 302. When the first device 300 communicates with the second device 302 by selecting one seed from the common seed candidate group, a probability of repetition of a link ID with a peripheral device is reduced. The common seed candidate group may include at least one seed, and at least one seed may include seeds of different tiers. The second device 302 may randomly select a seed belonging to an uppermost tier from the common seed candidate group. Further, the second device 302 may generate a random number corresponding to a number of a link ID included in a random seed belonging to the uppermost tier. The second device 302 may determine one from the selected random seed belonging to the uppermost tier and a link ID included in the selected random seed belonging to the uppermost tier through the random number.

The link ID may be changed according to a determined condition (e.g., time period) through an engaged common pattern. The link ID may be changed according to a determined condition (e.g., time period) based on engaged patterns by seeds in another scheme. In detail, a pattern changing a link ID by seeds may be determined based on a preset signal or the exchanged signal in a previous pairing time period. A pattern of changing the link ID may have a rule changing a link ID located in the seed for each period while exchanging data. The rule may be a determined order. The rule may be determined as a function format using a specific value as an input value. In detail, when the rule is determined as the function format, a link ID may be changed for each time period based on a function having an output value capable of selecting a time value in the link ID in a seed or a previous link ID as a next link ID. The pattern may include information indicting variation pattern indicating how the link ID is sequentially changed.

At operation 345, the second device 302 may transmit the selected random seed information belonging to the uppermost tier and a pairing response message including the random number to the first device 300. The first device 300 may select a link ID based on information included in the pairing response message. Through the foregoing procedure, the first device 300 and the second device 302 may determine a link ID to be used for communication.

At operation 350, the first device 300 and the second device 302 may transmit and receive data through a bandwidth corresponding to a selected link ID.

A device pair exchanging the pairing request message and the pairing response message may determine a link ID in a seed by an engaged rule. A method of determining the link ID according to various embodiments of the present disclosure selects a link ID in a range which the seed includes based on a selected seed and the random number included in the pairing request and response messages.

Through the procedure, the same link ID may be selected in the seed without additional communication. If there is the engaged common pattern or at least patterns by seeds, a determined condition of the selected link ID may be changed. The determined condition may include a case in which a time period or times to perform data transmission time period are equal to or greater than a predetermined value.

Figure 4:
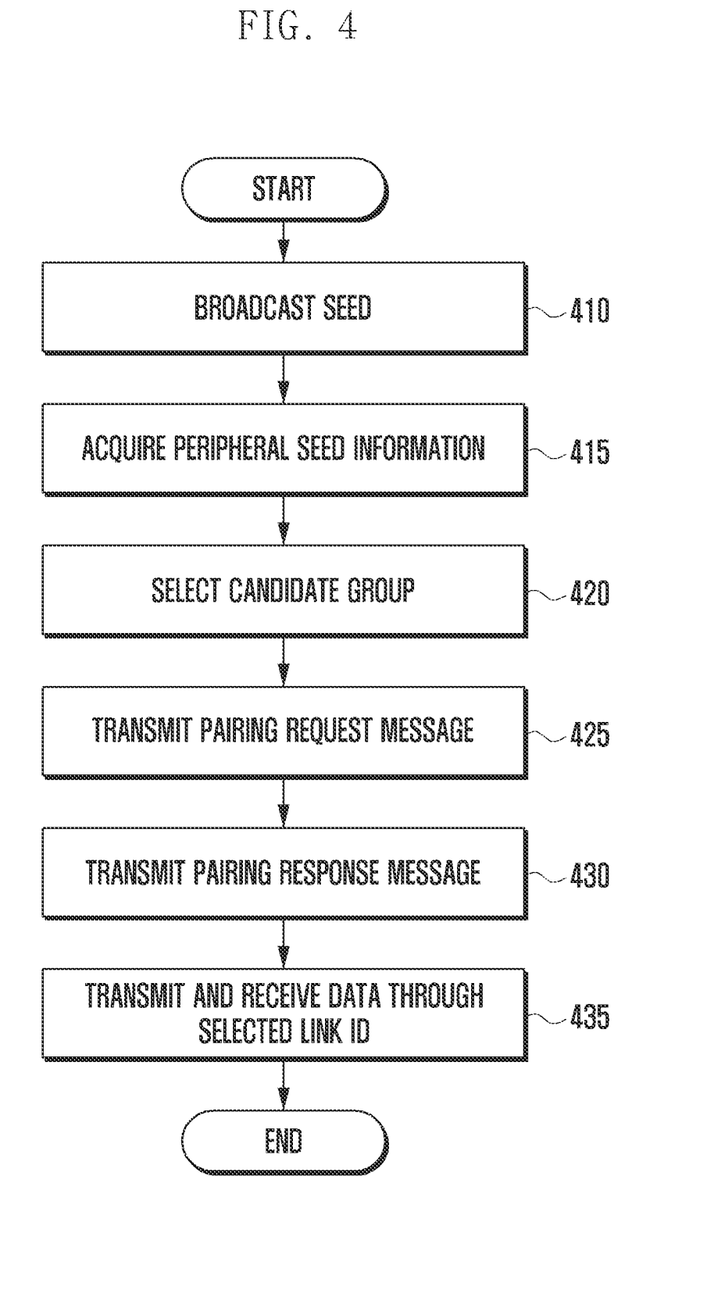
FIG. 4 is a flowchart illustrating a procedure of communication by a transmission device according to an embodiment of the present disclosure.

FIG. 4 is a flowchart illustrating a procedure of communication by a transmission device according to an embodiment of the present disclosure.

Referring to FIG. 4, at operations 410 to 420, a transmission device may operate in the same manner as at operations 310 and 320 of FIG. 3. For example, at operation 410, the transmission device broadcasts information (e.g., a currently used seed), and at operation 415, the transmission device may receive a broadcasted device (e.g., which was transmitted or broadcasted from another device).

At operation 420, the transmission device may select a seed candidate group. The seed candidate group includes seeds which another device neighboring the transmission device does not use.

At operation 425, the transmission device may transmit a pairing request message including the selected seed candidate group selected at operation 420 to a reception device.

According to various embodiments of the present disclosure, the pairing request message may include a field listed in the following Table 1. A transmission device ID and a reception device ID are used to identify a device for pairing. In addition, a parameter associated with authentication for security and Quality of Service (QoS) information, a traffic type of data for transmission may additionally be inserted.

TABLE 1

| Filed | Note |
|---|---|
| Transmission device ID | |
| Reception device ID | |
| Seed Candidates | Available Seed list |
| Authentication Parameter | |
| Reserved | |

At operation 430, the transmission device may receive a pairing response message in response to the pairing request message from the reception device. The pairing response message may include a seed and a random number selected by the reception device. The random number may correspond to a number of the link ID included in the seed selected by the reception device. According to various embodiments of the present disclosure, a range of the random number is changed according to the size of the seed, and the random number may be selected in the range of the number of link ID numerals including the seed.

According to various embodiments of the present disclosure, the pairing response message may include a field listed in a following Table 2. The transmission device ID and the reception ID are used to identify a desired device. The reception device compares the acquired seed candidate with the acquired seed candidate group. If a possible seed is included in the seed candidates, a seed is selected and is inserted into the pairing response message. A detailed operation of the reception device will be described later. In addition, the pairing response message may further include a parameter associated with authentication for security between devices.

TABLE 2

| Filed | Note |
|---|---|
| Transmission device ID | Device ID, Application ID, Address, and the like |
| Reception device ID | |
| Seed selection | Confirm the seed among seed candidates |
| Authentication Parameter | |
| Random Number | Generate random number or Pre-defined Pattern |
| Pattern ID | (option) common pattern or patterns by seeds |
| Reserved | |

The transmission device may determine selected seed information based on the pairing response message and a specific link ID based on the random number. Next, the transmission device may transmit and receive data to and from the reception device through a bandwidth corresponding to the selected link ID.

Accordingly, at operation 425, the transmission device may transmit the seed candidate group selected. In addition, the transmission device may transmit a random number corresponding to sizes of the selected seed candidate group.

Accordingly, at operation 430, the transmission device may receive the seed selected by the reception device. In addition, the transmission device may receive a random number selected the reception device among the transmitted random numbers.

At operation 435, the transmission device may select a link ID based on the seed and the random number selected by the reception device. If there is an engaged common pattern or at least one pattern designated by seeds, a determined condition (e.g., time period) of the selected link ID may be changed. In this manner, collision possibility of periodically changing CID by changing the link ID based on a pattern value. Accordingly, at operation 435, the transmission device may transmit and receive data to and from the reception device through a bandwidth corresponding to the selected link ID.

In detail, a link ID periodically selected in the seed may be changed based on the transmitted/received pattern information. The pattern information may include a sequence with a predetermined order or a function format outputting a specific output value according to the input value. Further, the sequence or function value may have different forms by seeds.

Figure 5:
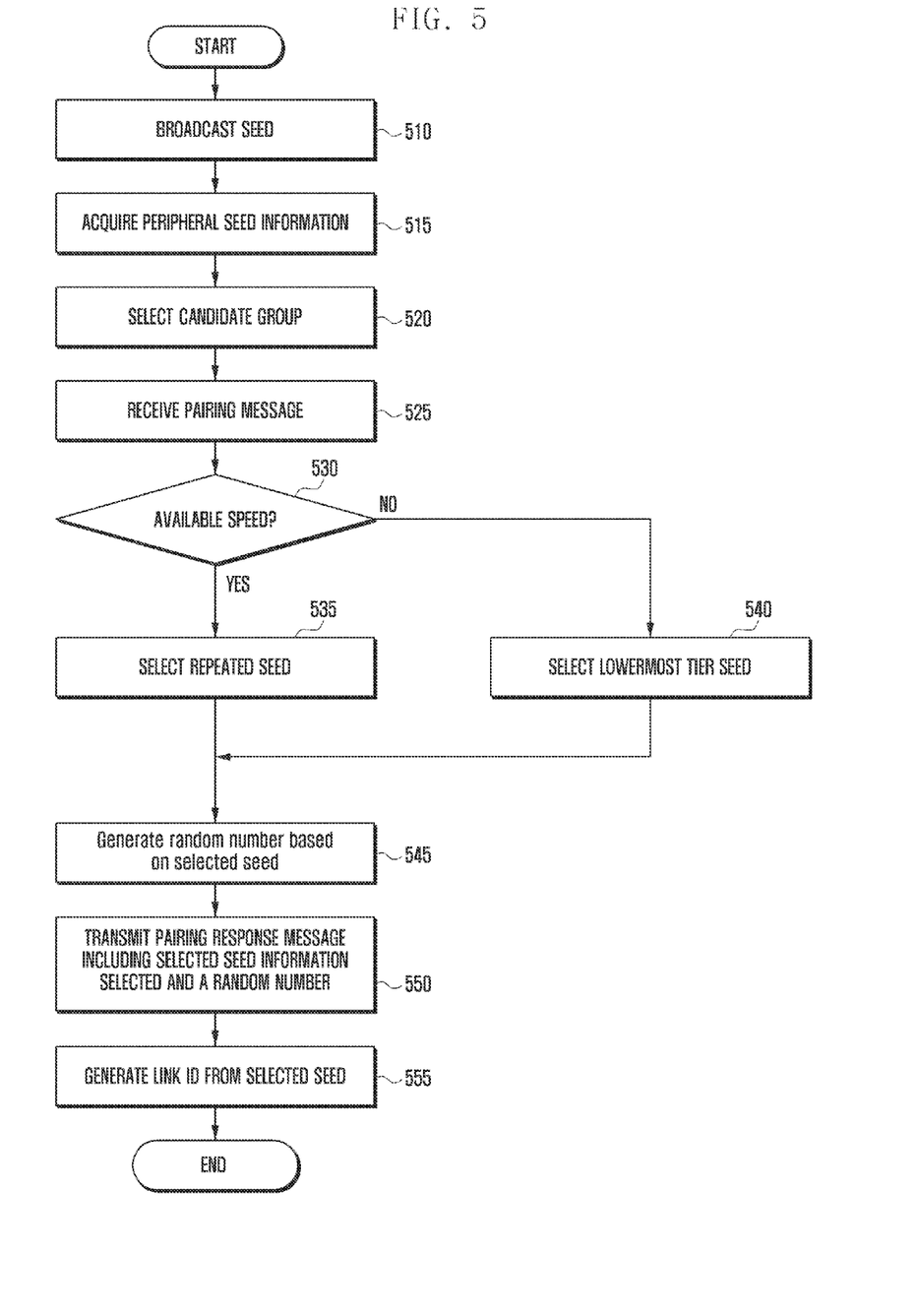
FIG. 5 is a flowchart illustrating a procedure of communication by a reception device according to an embodiment of the present disclosure.

FIG. 5 is a flowchart illustrating a procedure of communication by a reception device according to an embodiment of the present disclosure.

Referring to FIG. 5, at operations 510 and 520, the reception device may operate in the same manner as in operations 325 to 335. For example, at operation 510, the reception device broadcasts information (e.g., a currently used seed), and at operation 520, the reception device may receive a broadcasted device (e.g., which was transmitted or broadcasted from another device).

At operation 520, the reception device may select a seed candidate group which a neighboring device does not use.

At operation 525, the reception device may receive a pairing message including the seed candidate group information selected by the transmission device. The seed candidate group selected by the transmission device may include a seed which another peripheral device of the transmission device does not use.

At operation 530, the reception device determines whether an available seed exists. For example, the reception device compares the seed candidate group received at operation 525 with a seed candidate group selected at operation 520 to determine whether there is an available seed.

If the reception device determines that a speed is available at operation 530, then the reception device may proceed to operation 535 at which the reception device may select a repeated seed in a seed candidate group selected at operation 520 and a seed candidate group received at operation 525. For example, the reception device may select a seed which is included in the candidate group selected at operation 520 and a seed candidate group received at operations 525. Thereafter, the reception device proceeds to operation 545.

When a plurality of repeated seeds exists, the reception device may select a random seed from seeds of the uppermost tier. A scheme of selecting the seeds will be described later.

When the reception device determines that no seed is available at operation 530, then the reception device may proceed to operation 540 at which the reception device may select a lowermost tier seed. The lowermost tier seed may be a seed including a link ID with the most seeds. According to various embodiments of the present disclosure, when a seed of the lowermost tier is selected, the reception device may not transmit seed information selected by the transmission device. Thereafter, the reception device proceeds to operation 545.

At operation 545, the reception device may generate a random number based on the seed selected at operation 535 or at operation 540. The random number may be determined based on the link ID included in the selected seed. Preferably, one number may be optionally selected within a range of the number of link IDs included in the selected seed. Accordingly, one link ID may be determined based on the selected seed and link ID information.

At operation 550, the reception device may transmit a pairing response message including seed information selected at operation 535 or at operation 540 and transmit a random number selected (e.g., or generated) at operation 545 to the transmission device.

At operation 555, the reception device may generate a link ID from the selected seed to start data communication with the transmission device.

FIGS. 6A, 6B, 6C, and 6D are diagrams illustrating a method of dividing tiers of a link ID and seeds of a link ID according to an embodiment of the present disclosure.

Referring to FIGS. 6A-6D, the total number of link IDs used for the device to device communication is 80. The number of link IDs is illustrative purpose only and may be changed according to the embodiment. Further, the number of seeds or the number of tiers illustrative purpose only. Accordingly, various embodiments of the present disclosure are not limited to the number illustrated in drawings.

Whole link IDs 600*a*, 600*b*, 600*c*, and 600*d* may include 80 link IDs.

As illustrated in FIG. 6A, the whole link ID 600*a* includes seeds of a first tier. The first tier total 6 seeds 605 to 630 (e.g., 605, 610, 615, 620, 625, and 630). A numeral of the link ID included in each seed may be flexibly changed according to an embodiment of the present disclosure. Respective seeds included in the first tier may not have the same link ID. Accordingly, a link ID included in a seed belonging to the first tier is orthogonal to a link ID included in another seed.

As illustrated in FIG. 6B, the whole link ID 600*b* includes seeds of a second tier. The second tier includes four seeds 635 to 650 (e.g., 635, 640, 645, and 650). Respective seeds included in the second tier do not have the same link ID. However, each seed included in the second tier may have a link ID having the same link ID as that of at least one seed included in the first tier. According to various embodiments of the present disclosure, the seed 645 of the second tier may include the same link ID as the link ID of three seeds 605, 610, and 615 of the first tier.

As illustrated in FIG. 6C, the whole link ID 600*c* includes seeds of a third tier. The third tier includes total second seeds 655 and 660. Respective seeds included in the third tier do not have the same link ID. However, respective seeds included in the third tier may have the same link ID as that of at least one seed included in the first tier and the second tier. According to various embodiments of the present disclosure, the seed 655 of the third tier may have the same link ID as the link ID of three seeds 635, 640, and 645. In this manner, to determine the link ID included in each seed illustrated in the drawing depends on the embodiment, but is not limited to a method illustrated in the drawing.

As illustrated in FIG. 6D, the whole link ID 600*d* includes a seed of a fourth tier. In the embodiment, the fourth tier is the lowermost tier and a seed 665 included in the fourth tier has the same link ID of the link ID of the whole seeds in an upper tier (e.g., the first tier, the second tier, and/or the third tier).

Figure 7:
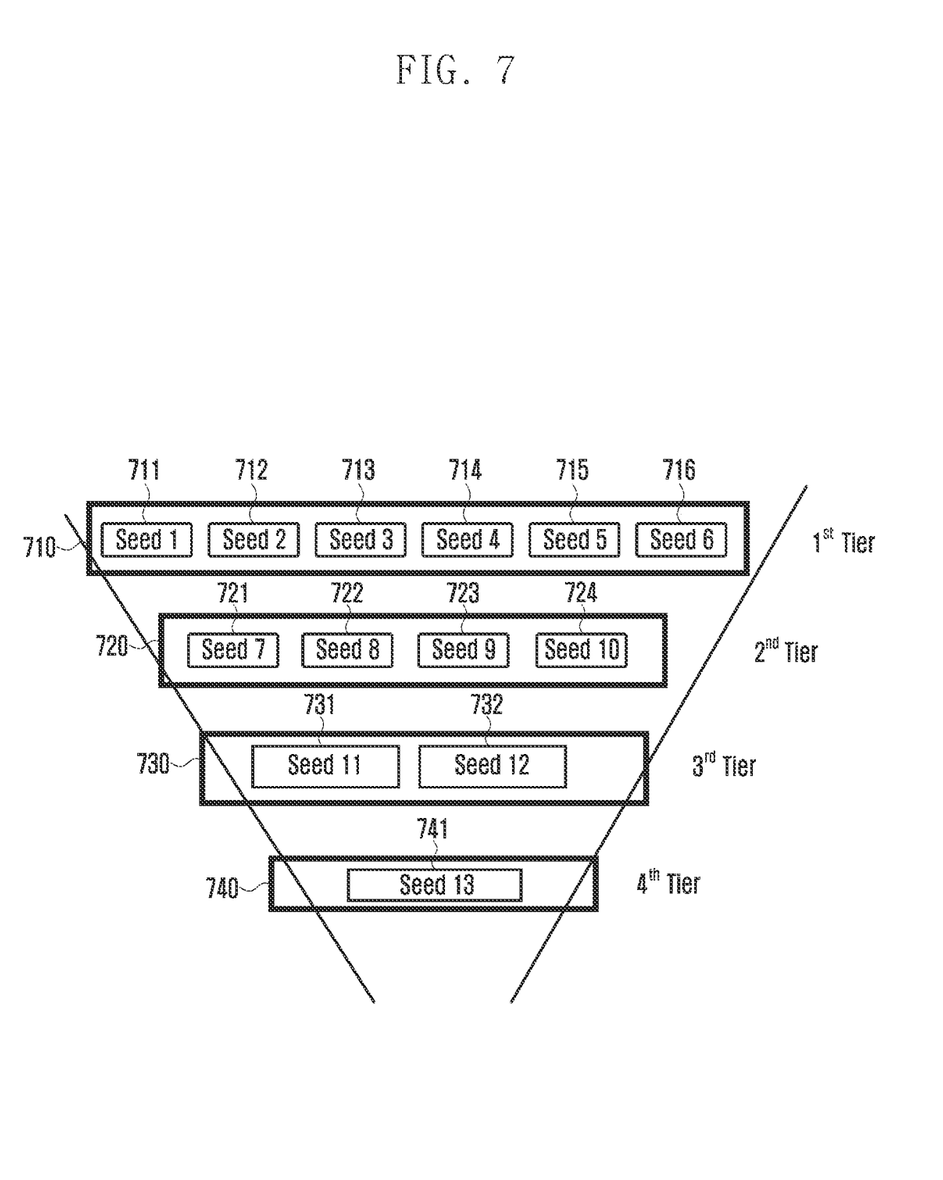
FIG. 7 is a diagram illustrating a configuration of tiers and seeds of a link ID according to an embodiment of the present disclosure.

FIG. 7 is a diagram illustrating a configuration of tiers and seeds of a link ID according to an embodiment of the present disclosure.

Referring to FIG. 7, respective tiers may have the same link ID.

The first tier 710 may include a Seed 1(711), a Seed 2 (712), a Seed 3 (713), a Seed 4 (714), a Seed 5 (715), and a Seed 6 (716).

As illustrated in FIG. 6, respective seeds included in the first tier 710 do not have the same link ID.

The second tier 720 may include a Seed 7 (721), a Seed 8 (722), a Seed 9 (723), and a Seed 10 (724). Respective seeds included in the second tier 720 do not have the same link ID. However, respective seeds included in the second tier 720 may have the same link ID as the link ID of seeds included in at least one first tier 710.

The third tier 730 may include a Seed 11 (731) and a Seed 12 (732). Respective seeds included in the third tier 730 do not have the same link ID. However, each seed included in the third tier 720 may have the same link ID of the link ID of each seed included in at least one first tier 710 or second tier 720.

The fourth tier 740 may include a Seed 13 (741). In the embodiment of the present disclosure, the Seed 13 (741) includes the whole link ID.

In this manner, the whole link ID may be classified as a seed having a tier relationship. When the number of devices receiving allocation of seeds located at an upper tier to communicate with does not exceed a total number of seeds, the probability of the device receiving allocation of seeds located at the upper tier having the same link ID of those of other devices is reduced, so communication may be easily performed.

Figure 8:
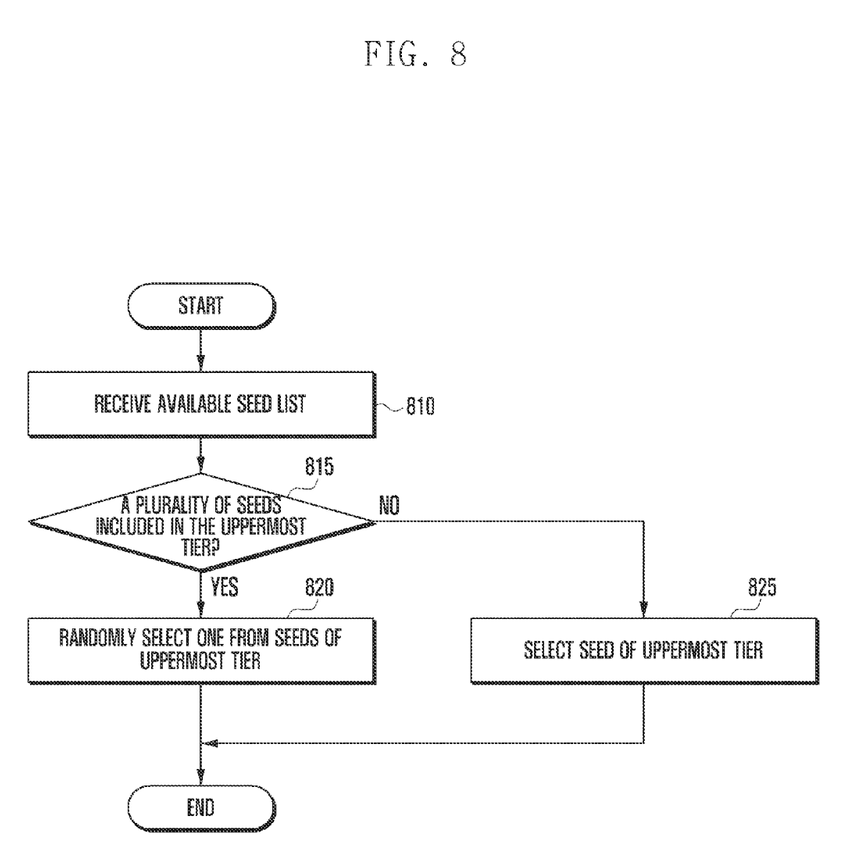
FIG. 8 is a flowchart illustrating a method of selecting seeds of a link ID according to an embodiment of the present disclosure.

FIG. 8 is a flowchart illustrating a method of selecting seeds of a link ID according to an embodiment of the present disclosure.

Although the seeds of the link ID may be selected by the transmission device or the reception device, but be preferably selected by the reception device.

Referring to FIGS. 5 and 8, the reception devices determines whether there is an available seed at operations 530 and 540, and the method of selecting the seeds of FIG. 8 may be applicable at an operation of selecting the seeds.

At operation 810, the reception device may receive an available seed list. The available seed includes a repeated seed from an available seed list which is transmitted to the reception device from the transmission device and a seed list which the reception device and a peripheral device do not use. For example, the available seed may correspond to a seed that is included in the available seed list which is transmitted to the reception device from the transmission device, and included in the seed list which the reception device and the peripheral device do not use.

At operation 815, the reception device may determine whether a plurality of seeds are included in the uppermost tier among the available seed list. Referring to FIG. 7, when a Seed 1 (711), a Seed 3 (713), a Seed 7 (721) are included in the available seed list, an uppermost tier becomes a first tier 710 and two Seeds 711 and 713 are included in the first tier 710.

If the reception device determines that the plurality of seeds are included in the uppermost tier among the available seed list at operation 815, then the reception device may proceed to operation 820 at which the reception device may randomly select one from seeds of the uppermost tier. For example, the reception device may randomly selecting a seed from seeds of the uppermost tier because a probability of selecting a repeated link ID as compared with a link ID included in a lower tier is reduced in a case of a link ID included in a seed of an upper tier, and the repletion probability is the same between seeds of the same tier.

If the reception device determines that a plurality of seeds are not included in the uppermost tier among the available seed list at operation 815, then the reception device may proceed to operation 825 at which the reception device selects the seed included in the uppermost tier. For example, one Seed is included in the uppermost tier among the available Seed list, the one Seed may be selected.

Further, according to various embodiments of the present disclosure, the transmission or reception device for communication recognizes a seed to be delayed from a previous time period through seed broadcasting from another device. The transmission or reception terminal selects a candidate seed depending on several rules. First, the lower a tier is, the higher a priority is. A seed of a first tier including three orthogonal link IDs has the highest priority. Accordingly, the transmission or reception device selects seeds of a higher tier from seeds of a lower tier. For example, the level of a tier is inversely related to the level of priority associated with seeds corresponding to a tier. Second, the seeds of the same tier have the same priority. For example, the transmission or reception terminal randomly selects various seeds included in the same tier when the seeds are used. Third, one terminal generally occupies each seed. Repetition selection is possible due to an error in a selective procedure. If the seed is used in the seed broadcasting operation, the transmission or reception device does not select a corresponding seed. Finally, anyone may participate in a final tier and the final tier is not transmitted in the seed broadcasting operation. According to the embodiment, in the seed broadcasting operation, seeds of the final tier may be also transmitted. The transmission/reception device having the final tier in a previous time period confirms whether a seed of an upper tier is empty in the seed broadcasting operation and selects a corresponding seed.

According to various embodiments of the present disclosure, when allocating a connection ID in a device to device communication environment, even if there are a small number of devices, an overhead for searching for the connection ID is not great. Further, when many devices exist within a specific range, a probability of devices having the same connection ID is reduced. Accordingly, the device to device communication can be easily performed.

It will be appreciated that various embodiments of the present disclosure according to the claims and description in the specification can be realized in the form of hardware, software or a combination of hardware and software.

Any such software may be stored in a non-transitory computer readable storage medium. The non-transitory computer readable storage medium stores one or more programs (software modules), the one or more programs comprising instructions, which when executed by one or more processors in an electronic device, cause the electronic device to perform a method of the present disclosure.

Any such software may be stored in the form of volatile or non-volatile storage such as, for example, a storage device like a Read Only Memory (ROM), whether erasable or rewritable or not, or in the form of memory such as, for example, Random Access Memory (RAM), memory chips, device or integrated circuits or on an optically or magnetically readable medium such as, for example, a Compact Disk (CD), Digital Versatile Disc (DVD), magnetic disk or magnetic tape or the like. It will be appreciated that the storage devices and storage media are various embodiments of non-transitory machine-readable storage that are suitable for storing a program or programs comprising instructions that, when executed, implement various embodiments of the present disclosure. Accordingly, various embodiments provide a program comprising code for implementing apparatus or a method as claimed in any one of the claims of this specification and a non-transitory machine-readable storage storing such a program.

Although embodiments have been described with reference to a number of illustrative embodiments thereof, it should be understood that numerous other modifications and embodiments can be devised by those skilled in the art that will fall within the spirit and scope of the principles of this disclosure, and variations and modifications can be made to the disclosure without departing from the technical spirit and equivalent scopes of the appended claims of the present disclosure.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of performing pairing by a transmission terminal in device to device communication, the method comprising:

classifying a plurality of link identifications for identifying a data transmission and reception channel as a seed of at least one link identification;

receiving information including a tier and a seed of a link identification used in communication from another terminal by the another terminal;

selecting an available candidate link identification seed among the seed of the at least one link identification;

transmitting a pairing request message including seed information associated with the selected available candidate link identification seed; and receiving a pairing response message corresponding to the pairing request message, wherein the available candidate link identification seed is a seed which is not used in communication from the another terminal.

2. The method of claim 1, wherein the classifying of the plurality of link identifications comprises:
dividing the plurality of link identifications into link identification sets of a first tier having no intersection set; and
dividing the plurality of link identifications into a link identification set of a second tier having an intersection set with at least one link identification set of the first tier,
wherein the link identification set of the second tier does not have shared link identification.

3. The method of claim 2, wherein the selecting of the available candidate link identification seed comprises:
selecting a tier and a seed of the link identification that does not overlap with the received tier and the seed of the link identification used in communication from another terminal.

4. The method of claim 1, further comprising:
determining a link identification to be used for communication among the selected link identification seed,
wherein the receiving of the information comprises receiving the selected link identification set information and at least one of a predetermined numeral and link identification variation pattern information corresponding to a size of the selected link identification set information, and
wherein the determining of the link identification comprises determining a link identification to be used for the communication based on the at least one of the predetermined numeral and the link identification variation pattern information.

5. A method of performing pairing by a reception terminal in device to device communication, the method comprising:
classifying a plurality of link identifications for identifying a data transmission and reception channel as a seed of at least one link identification;
searching for an available candidate link identification seed among the seed of the at least one link identification;
receiving a pairing request message including seed information associated with a candidate link identification seed selected by a transmission terminal side;
determining a seed of a link identification to be used for communication based on the received candidate link identification seed information and the searched available candidate link identification seed; and
transmitting a pairing response message including the determined seed of the link identification to be used for the communication, and
wherein the available candidate link identification seed is a seed which is not used in communication from the another terminal.

6. The method of claim 5, wherein the classifying of the plurality of link identifications comprises:
dividing the plurality of link identifications into link identification sets of a first tier having no intersection set; and
dividing the plurality of link identifications into a link identification set of a second tier having an intersection set with at least one link identification set of the first tier,
wherein the link identification set of the second tier does not have shared link identification.

7. The method of claim 6, wherein the searching for the available candidate link identification seed comprises:
searching for a tier and the seed of the link identification that does not overlap with the received tier and the seed of the link identification used in communication by the another terminal.

8. The method of claim 5, wherein the transmitting of the pairing response message comprises:
transmitting the pairing response message including seed information associated with the determined seed of the link identification and at least one of a predetermined numeral or link identification variation pattern information corresponding to a size of the determined link identification set information.

9. The method of claim 6, wherein the determining of the seed of the link identification comprises:
determining a predetermined seed of a highest tier among seeds of a link identification having a same tier and link identification set of a link identification between the searched link identification seed and seed of the link identification, and between the tier of the received candidate link identification seed information and the seed of the link identification.

10. The method of claim 9, wherein the determining of the predetermined seed of the highest tier among seeds of the link identification comprises:
determining a link identification of a lowermost tier when a seed of a link identification having a same tier and seed of the link identification between the received tier of the candidate link identification and a seed of a link identification does not exist.

11. A transmission terminal for performing device to device communication, the transmission terminal comprising:
a controller configured to:
classify a plurality of link identifications for identifying a data transmission and reception channel as a seed of at least one link identification, and
select an available candidate link identification seed among the seed of the at least one link identification;
a transmitter configured to transmit a pairing request message including seed information associated with the selected available candidate link identification seed; and
a receiver configured to:
receive information including a tier and a seed of a link identification used in communication from another terminal by the another terminal, and
receive a pairing response message corresponding to the pairing request message,
wherein the available candidate link identification seed is a seed which is not used in communication from the another terminal.

12. The transmission terminal of claim 11,
wherein the controller is further configured to:
divide the plurality of link identifications into link identification sets of a first tier having no intersection set, and
divide the plurality of link identifications into a link identification set of a second tier having an intersection set with at least one link identification set of the first tier, and
wherein the link identification set of the second tier does not have shared link identification.

13. The transmission terminal of claim 12,
wherein the controller is further configured to select a tier and a seed of the link identification that does not overlap with the received tier and seed of the link identification used in communication by the another terminal.

14. The transmission terminal of claim 11,
wherein the receiver is configured to receive the selected candidate link identification seed and a predetermined numeral or link identification variation pattern information corresponding to a size of the selected candidate link identification seed, and wherein the controller is further configured to determine a link identification to be used for communication among the selected candidate link identification seed.

15. A reception terminal for performing device to device communication, the reception terminal comprising:
   a receiver configured to receive a pairing request message including seed information associated with a candidate link identification seed selected by a transmission terminal side;
   a controller configured to:
      classify a plurality of link identifications for identifying a data transmission and reception channel as a seed of at least one link identification,
      search for an available candidate link identification seed among the seed of the at least one link identification, and
      determine a seed of a link identification to be used for communication based on the received candidate link identification seed information associated with the candidate link identification seed and the searched candidate link identification seed; and
   a transmitter configured to transmit a pairing response message including the determined seed of the link identification to be used for the communication,
   wherein the available candidate link identification seed is a seed which is not used in communication from the another terminal.

16. The reception terminal of claim 15,
   wherein the controller is further configured to:
      divide the plurality of link identifications into link identification sets of a first tier having no intersection set, and
      divide the plurality of link identifications into a link identification set of a second tier having an intersection set with at least one link identification set of the first tier, and
   wherein the link identification set of the second tier does not have shared link identification.

17. The reception terminal of claim 16,
   wherein the controller is further configured to search for a tier and a seed of the link identification that does not overlap with the received tier and seed of the link identification used in communication by the another terminal.

18. The reception terminal of claim 15, wherein the pairing response message further includes a predetermined numeral corresponding to a size of the determined link identification set information.

19. The reception terminal of claim 16, wherein the controller is further configured to determine a predetermined seed of a highest tier among seeds of a link identification having a same tier and link identification set of a link identification between the searched link identification seed and seed of the link identification, and between the tier of the received candidate link identification seed information and the seed of the link identification.

20. The reception terminal of claim 19, wherein the controller is further configured to determine a link identification of a lowermost tier when a seed of a link identification having a same tier and seed of the link identification between the received tier of the candidate link identification and a seed of a link identification does not exist.

* * * * *